(12) United States Patent
Adler et al.

(10) Patent No.: US 7,773,335 B1
(45) Date of Patent: Aug. 10, 2010

(54) CALIBRATING SERVOS

(75) Inventors: Jason Adler, Fremont, CA (US); David Rutherford, San Jose, CA (US); Man Cheung, Campbell, CA (US); Perry Neos, Los Altos, CA (US); Luan Ton-That, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/192,981

(22) Filed: Aug. 15, 2008

Related U.S. Application Data

(60) Provisional application No. 60/956,001, filed on Aug. 15, 2007.

(51) Int. Cl.
*G11B 21/02* (2006.01)
*G11B 5/596* (2006.01)
*G11B 5/09* (2006.01)

(52) U.S. Cl. .................. 360/75; 360/51; 360/77.07

(58) Field of Classification Search .................. None
See application file for complete search history.

(56) References Cited

U.S. PATENT DOCUMENTS

| | | |
|---|---|---|
| 6,987,636 B1 | 1/2006 | Chue et al. |
| 6,992,852 B1 | 1/2006 | Ying et al. |
| 7,019,937 B1 | 3/2006 | Liikanen et al. |
| 7,068,459 B1 | 6/2006 | Cloke et al. |
| 7,088,533 B1 | 8/2006 | Shepherd et al. |
| 7,113,362 B1 | 9/2006 | Lee et al. |
| 7,167,333 B1 | 1/2007 | Liikanen et al. |
| 7,209,312 B1 | 4/2007 | Sutardja |
| 7,248,427 B1 | 7/2007 | Everett et al. |
| 7,477,472 B2 * | 1/2009 | Sado et al. .............. 360/75 |

* cited by examiner

*Primary Examiner*—Andrew L Sniezek

(57) ABSTRACT

Methods, systems, and apparatus, including computer program products, are described for calibrating servos, and in some implementations for calibrating spiral servos for use in self-servo-write processes. In one aspect, a method is provided that includes determining a measured slope of a spiral, and calibrating radial spacing between servo tracks using the measured slope and a target slope.

27 Claims, 13 Drawing Sheets

CALIBRATING SERVOS

CROSS-REFERENCE TO RELATED APPLICATIONS

This application claims priority to U.S. Provisional Application Ser. No. 60/956,001, for "Method to Control Track Pitch in a Self-Servowrite Process," filed on Aug. 15, 2007, which is incorporated by reference herein in its entirety.

TECHNICAL FIELD

The subject matter of this specification relates to servos.

BACKGROUND

In magnetic-medium-based storage devices, data can be stored on circular, concentric tracks on a magnetic disk surface. A read/write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read/write head needs to be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the head servo system operates properly. The servo information can be written on each surface as a radially extending set of spokes or wedges. The portion of a servo wedge at a particular track location may contain a sync field, and index mark, a gray coded track number, and two or more fine-positioned offset bursts configured in an echelon across the track. Head positioning relative to a track center can be determined and corrected, if necessary, by reading and noting the respective amplitudes and timings of the offset bursts.

A servo writer can be used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive to be manufactured. Further, as track density increases, the servo writing time required to write the servo information also increases, which can create a bottleneck in the disk drive manufacturing process.

Conventional hard disk drives (HDD) increasingly use self-servo-write (SSW) processes to write servo sectors using the same heads that are used to read/write data. In some implementations, servo patterns can be written on a machine readable medium for position control. For example, spirals can be written on a machine readable medium. A servo can use the spirals (e.g., servo on the spirals) to position heads to write servo tracks. Typically, the servo moves in a radial direction across the spirals and measures the time shifts of the spirals. For example, a time shift of a spiral can be defined as an amount of time that corresponds to a difference in circumferential distance from one radial location on a spiral to another radial location on the spiral. The servo can determine radial position measurements from the measured time shifts. The measured time shifts depend on a slope of the spiral. Therefore, the slope of the spiral can affect the placement of individual servo tracks and radial spacing between the servo tracks. Variations or inaccuracies in the slope of the spiral can result in imprecise radial spacing between servo tracks.

SUMMARY

Methods, systems, and apparatus, including computer program products, are described for calibrating servos, and in some implementations for calibrating spiral servos for use in self-servo-write processes.

In one aspect, an apparatus is provided that includes a processing module that determines a measured slope of a spiral, and a calibration module that calibrates radial spacing between servo tracks using the measured slope and a target slope. Other embodiments of this aspect include corresponding systems, methods, and computer program products.

One or more implementations can optionally include one or more of the following features. The calibration module can include a scaling submodule that scales target timing information according to a ratio of the target slope to the measured slope to determine the radial spacing. The calibration module can include a scaling submodule that scales a target track pitch according to a ratio of the target slope to the measured slope to determine the radial spacing. The processing module can include a scaling submodule that calibrates the measured slope of the spiral. The processing module can include a detection submodule that determines a gain of a system that includes a voice coil motor and a servo signal. The processing module can include a detection submodule that determines an integrated magnitude of the spiral. The processing module can include a correction submodule that determines noise in the integrated magnitude and removes the noise from the integrated magnitude. The processing module can include a detection submodule that determines a difference between a predicted frequency and an actual frequency of the spiral.

In another aspect, a method is provided that includes determining a measured slope of a spiral, and calibrating radial spacing between servo tracks using the measured slope and a target slope. Other embodiments of this aspect include corresponding systems, apparatus, and computer program products.

One or more implementations can optionally include one or more of the following features. Calibrating radial spacing can include receiving target timing information; scaling the target timing information according to a ratio of the target slope to the measured slope, producing calibrated timing information; and determining the radial spacing using the calibrated timing information. Calibrating radial spacing can include receiving a target track pitch; scaling the target track pitch according to a ratio of the target slope to the measured slope, producing a calibrated track pitch; and determining the radial spacing using the calibrated track pitch.

The spiral can be previously written. Determining a measured slope of a spiral can include determining a first measurement of the measured slope of the spiral; and calibrating the first measurement of the measured slope of the spiral, producing a second measurement of the measured slope of the spiral.

Determining a measured slope of a spiral can include determining a gain of a system that includes a voice coil motor and a servo signal. The gain can be a mechanical gain. A magnitude of the gain can be inversely proportional to a magnitude of the measured slope. Determining the gain can include injecting a signal into a controller, determining a control command and a position error, and determining a ratio of the position error to the control command. The method can further include controlling the voice coil motor with the controller. The position error and the control command can be determined in the frequency domain.

Determining a measured slope of a spiral can include determining an integrated magnitude of a first signal that includes the spiral. The integrated magnitude can be inversely proportional to the measured slope of the spiral. The method can further include determining noise in the integrated magnitude, and removing the noise from the integrated magnitude. Determining noise can include determining a magnitude of the first signal at an edge of an integration window, and multiplying the magnitude by a number of samples in the integration window. In addition, determining noise can include determining a minimum magnitude of the first signal in an integration window, and multiplying the minimum magnitude by a number of samples in the integration window. Furthermore, determining noise can include determining an integrated magnitude of a second signal that does not include the spiral.

Determining a measured slope of a spiral can include determining a predicted frequency for writing the spiral; determining an actual frequency of the spiral; and determining a difference between a target velocity and an actual velocity, where the difference is proportional to a difference between the predicted frequency and the actual frequency. Determining an actual frequency of the spiral can include determining a time between sync patterns of the spiral.

Particular embodiments of the subject matter described in this specification can be implemented to realize none, one or more of the following advantages. Calibrating spiral servos for use in self-servo-write processes can (i) increase the accuracy of servo track placement; (ii) increase the accuracy of radial spacing between servo tracks; (iii) increase the yield of useable hard disk drives; and (iv) increase the reliability of hard disk drives by reducing servo issues (e.g., interference between servo tracks) and data track encroachment.

The details of one or more embodiments of the invention are set forth in the accompanying drawings and the description below. Other features and advantages of the invention will be apparent from the description and drawings, and from the claims.

DETAILED DESCRIPTION

Figure 1:
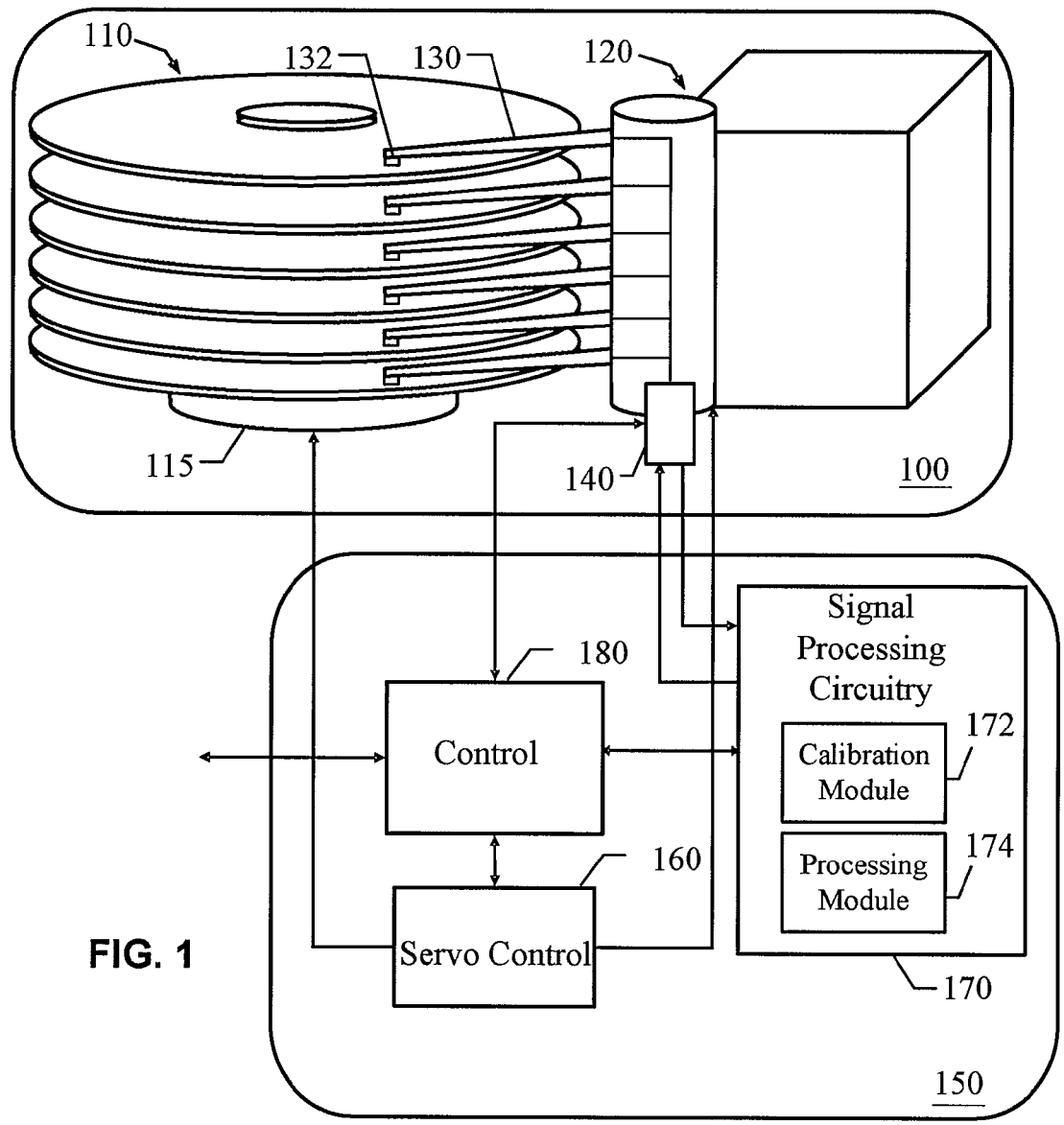
FIG. 1 is a diagram showing an example hard disk drive.

FIG. 1 is a diagram showing an example hard disk drive. The hard disk drive includes a head-disk assembly 100 and drive electronics 150. The head-disk assembly 100 includes machine readable mediums 110 (e.g., disks), a motor assembly 115, a head assembly 120, arms 130, and heads 132 (e.g., read/write heads). The drive electronics 150 includes a servo control 160 (e.g., a servo controller), signal processing circuitry 170, and a control 180 (e.g., a controller). The control 180 can direct the servo control 160 to control mechanical operations of the head-disk assembly 100. For example, the control 180 can direct the servo control 160 to position the heads 132 using the arms 130. As another example, the control 180 can direct the servo control 160 to control the rotational speed of the machine readable mediums 110, through the motor assembly 115. The signal processing circuitry 170 can include a processing module 172 and a calibration module 174. The processing module 172 can process read signals, write signals, and servo signals, for example. The calibration module 174 can calibrate the signals, timing information, and track pitch, for example.

Figure 2B:
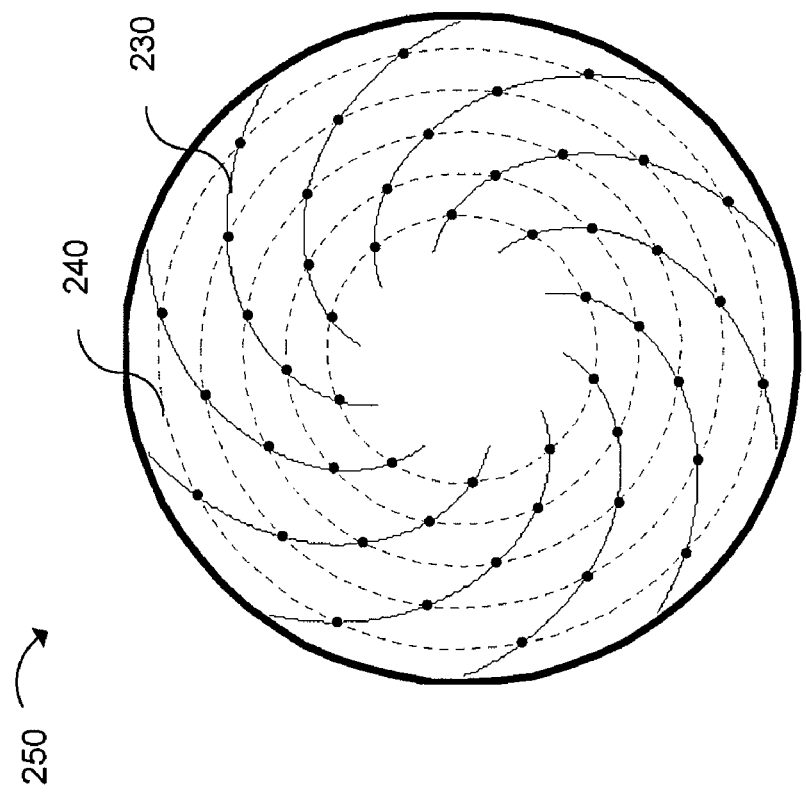
FIG. 2B is a diagram showing another example machine readable medium that includes spirals and servo tracks.
Figure 2A:
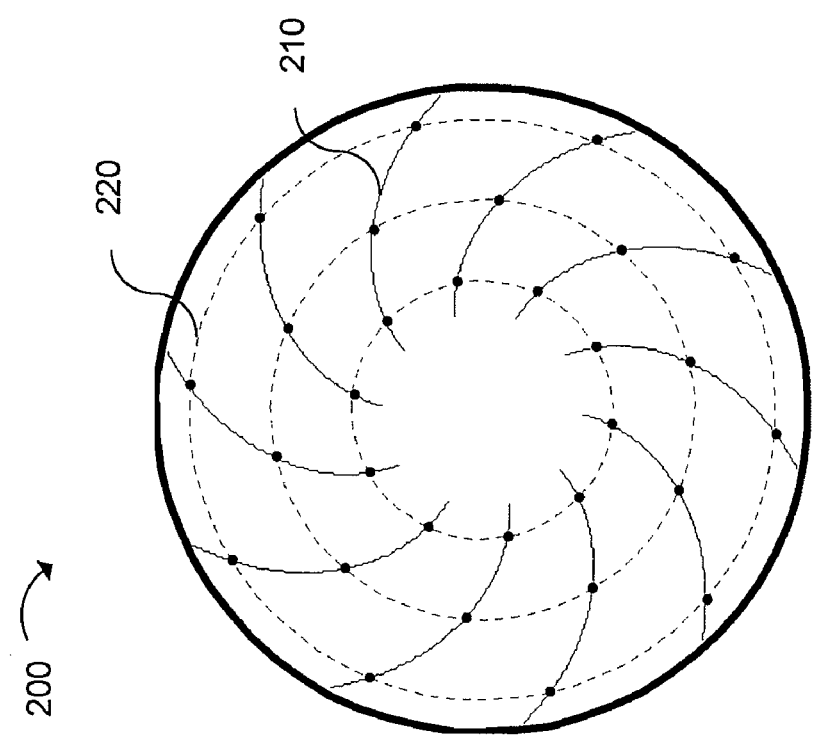
FIG. 2A is a diagram showing an example machine readable medium that includes spirals and servo tracks.

FIG. 2A is a diagram showing an example machine readable medium 200 that includes spirals 210 and servo tracks 220. The spirals 210 can be written at a first speed that results in a first slope for the spirals 210. A servo can move, for example, in a radial direction and use the spirals 210 to control head position, and a head can write the servo tracks 220. For example, the servo can move the head to a location where the circumferential location of the spiral has shifted a predetermined amount of time (e.g. a spiral shift time) to determine the radial spacing between servo tracks. The radial spacing between the servo tracks can define the track pitch (e.g., radial track density).

FIG. 2B is a diagram showing another example machine readable medium 250 that includes spirals 230 and servo tracks 240. The spirals 230 can be written at a second speed that results in a second slope for the spirals 230. The first speed can be greater than the second speed. Therefore, the spirals 210 can be referred to as "faster written" spirals, and the spirals 230 can be referred to as "slower written" spirals. Generally, faster written spirals have slopes that are greater than the slopes of slower written spirals. Because the spirals are used to write servo tracks, the slopes can affect the radial spacing between servo tracks.

Figure 3B:
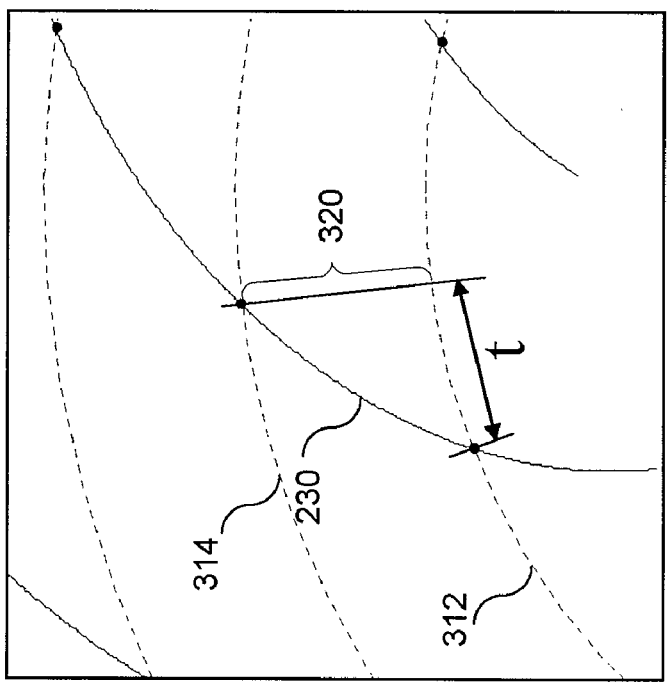
FIG. 3B is a diagram showing example spirals and servo tracks of FIG. 2B.
Figure 3A:
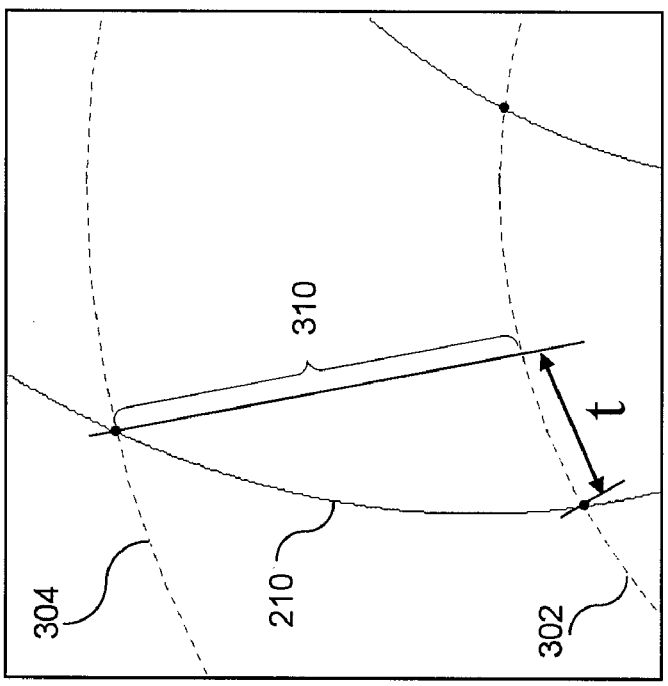
FIG. 3A is a diagram showing example spirals and servo tracks of FIG. 2A.

FIG. 3A is a diagram showing example spirals and servo tracks of FIG. 2A. FIG. 3B is a diagram showing example spirals and servo tracks of FIG. 2B. In some implementations, a servo moves in a radial direction until a spiral has shifted a predetermined amount of time t to a location to write a servo track. For example, referring to FIG. 3A, the servo control 160 can control a head 132 to move from a first servo track 302, until the circumferential location of spiral 210 has shifted a predetermined amount of time t to a second servo track 304. Then, the head 132 can write a servo track. Radial spacing 310 can be defined, for example, by the radial distance between adjacent servo tracks (e.g., servo tracks 302 and 304).

Referring to FIG. 3B, the spiral 230 is a slower written spiral and has a slope less than the slope of the spiral 210 of FIG. 3A. Moving until the circumferential location of spiral 230 has shifted for the predetermined amount of time t, the head 132 can travel from a third servo track 312, to a fourth servo track 314. The radial spacing 320 between the third servo track 312 and the fourth servo track 314 is less than the radial spacing between the first track 302 and the second servo track 304 of FIG. 3A.

In some implementations, the spirals have previously been written on the machine readable medium. In order to generate substantially a same radial spacing between servo tracks from spirals with different slopes, the predetermined amount of time t can be calibrated.

Figure 4B:
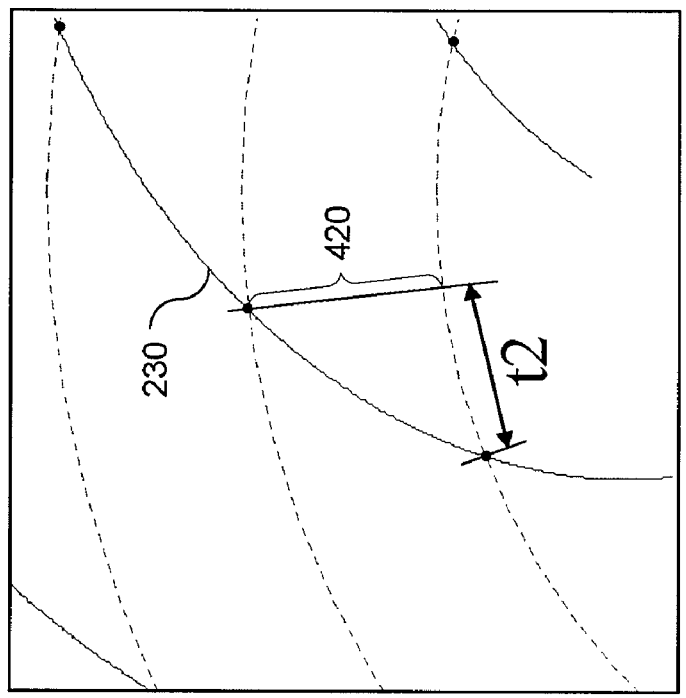
FIG. 4B is a diagram that includes the example spirals of FIG. 3B.
Figure 4A:
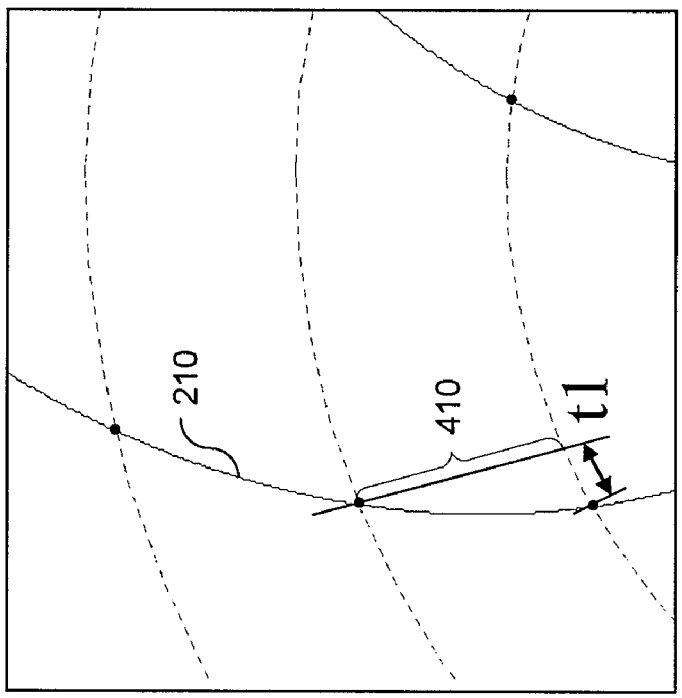
FIG. 4A is a diagram that includes the example spirals of FIG. 3A.

FIG. 4A is a diagram that includes the example spirals of FIG. 3A. FIG. 4B is a diagram that includes the example spirals of FIG. 3B. Referring to FIGS. 4A and 4B, the predetermined amount of time t can be calibrated so that the predetermined amount of time is decreased for spirals that have a slope greater than a target slope.

The slope of the spiral determines a relationship between a circumferential location of the spiral and the radial location of the head. The relationship can be expressed as:

radial_location ∝ slope·t.

The radial location of the head can be determined by determining the circumferential location of the spiral, which can be represented by spiral timing. For example, increased circumferential movement of the spiral (e.g., increase in the amount of time shift of the spiral) corresponds to increased radial movement.

Because the spiral 210 is a faster written spiral and has a greater slope, the head 132 travels a greater radial distance for the same predetermined amount of time t (e.g., a first spiral shift time) of the faster spiral than a slower written spiral. Therefore, the predetermined amount of time t can be calibrated to equal t1, so that the head 132 travels a substantially same radial distance 410 as the radial distance 420 traveled with the predetermined amount of time t2 (e.g., a second spiral shift time) on the slower written spiral 230.

The slope of a spiral can be determined and used to calibrate the predetermined amount of time. By adjusting the predetermined amount of time, the radial distance between servo tracks can be calibrated. The radial distance between servo tracks, on a single machine readable medium or among different machine readable mediums, for example, can be calibrated so that the radial distances between servo tracks are substantially the same.

In some implementations, the slope can be determined by determining a gain of a voice coil motor (e.g., a voice coil motor in the motor assembly 115). The processing module 174 can include, for example, a detection submodule that determines the gain of the voice coil motor. For example, the mechanical gain of the voice coil motor can be measured periodically as the heads move across the machine readable medium, as described in further detail below. In some implementations, the slope can be determined by determining a "red-shift" of the pattern within the spiral. The processing module 174 can include, for example, a detection submodule that determines the "red-shift" of the pattern within the spiral. For example, the "red-shift" of the pattern within the spiral can be measured as the head moves across the machine readable medium, as described in further detail below. In some implementations, the slope can be determined by determining an integrated magnitude of the spiral. The processing module 174 can include, for example, a detection submodule that determines the integrated magnitude of the spiral. For example, the integrated magnitude of the spiral can be measured as the head moves across the machine readable medium, as described in further detail below.

In some implementations, a plurality of the aforementioned implementations can be used in combination to determine the slope. For example, determining an integrated magnitude of a spiral can provide a relative measurement of the slope of the spiral. The relative measurement can be calibrated using measurements of the slope determined from the gain of the voice coil motor, or from the "red-shift" of the pattern within the spiral. The processing module 174 can include, for example, a scaling submodule that calibrates the relative measurement of the slope. For example, the mechanical gain and the integrated magnitude can be used to determine the slope of one or more spirals at a first radial location. The slope of the one or more spirals at a first radial location, determined by the mechanical gain, can be compared to the slope of the one or more spirals at the first radial location, determined by the integrated magnitude, and used as a reference to calibrate integrated magnitude measurements of slopes of the one or more spirals at other radial locations. As another example, the "red-shift" can be used to determine the slope that is used as a reference to calibrate the integrated magnitude measurements of the slopes of the one or more spirals at the other radial locations. Other implementations are possible.

Figure 5:
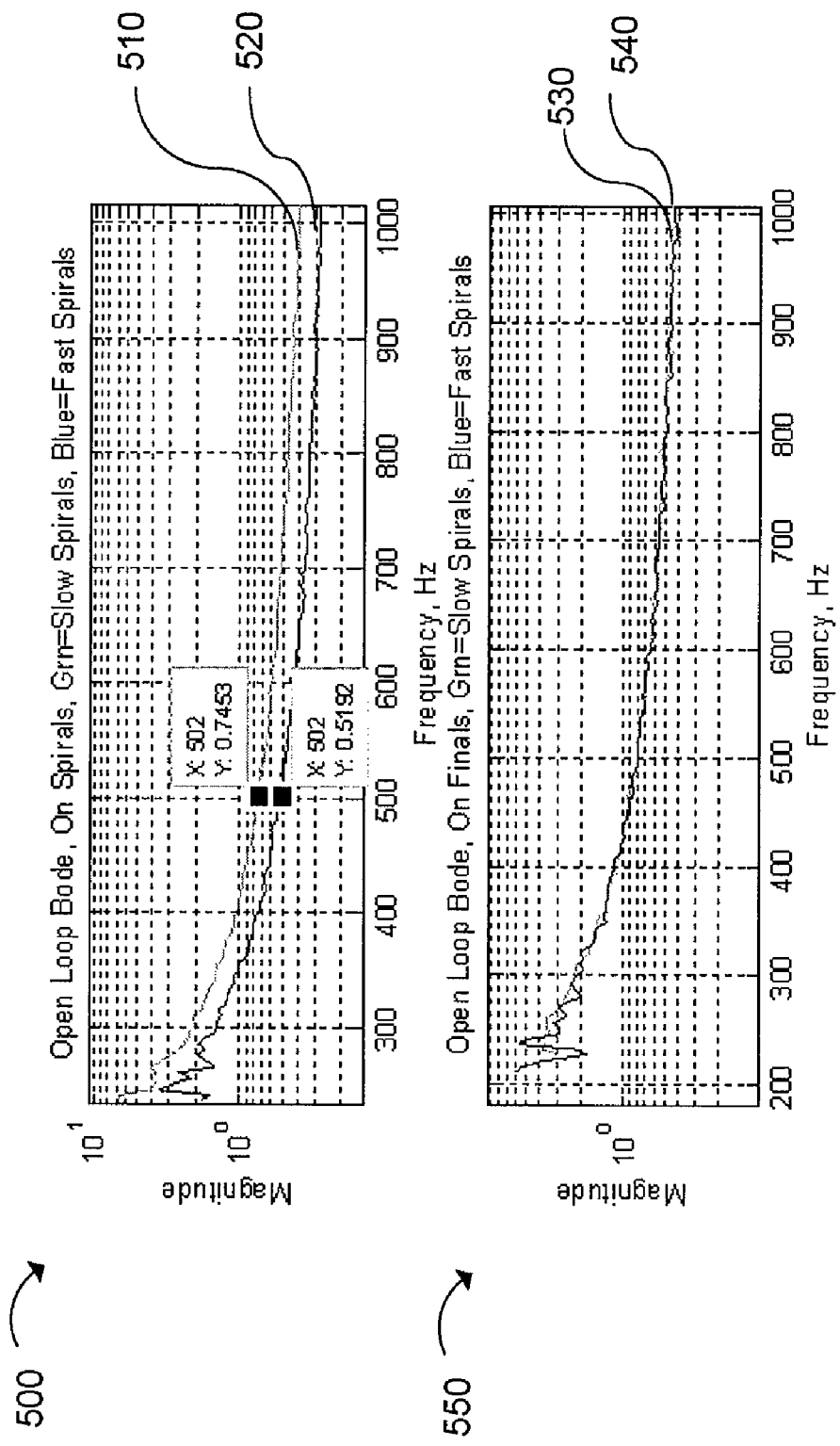
FIG. 5 includes plots showing example mechanical gains.

FIG. 5 includes plots 500 and 550 showing example mechanical gains 510, 520, 530, and 540. A mechanical gain can define a reaction of a measured location of a head (e.g., radial position) to a control command from the controller 180, for example. The control command can be, for example, a current to adjust the velocity of a voice coil motor. Components of a hard disk drive that can affect the mechanical gain can include, but are not limited to, the voice coil motor, arm mechanics (e.g., head assembly 120 and arms 130), and the servo signal (e.g., a spiral signal). Characteristics of the servo signal can be determined from a measured mechanical gain. For example, a slope of a spiral can be determined from the measured mechanical gain. In some implementations, the measured mechanical gain can be expressed as the product of a voice coil motor (VCM) gain, electrical gain, and other fixed mechanical gains, divided by the slope of the spiral. Therefore, the slope of the spiral can be expressed as:

$$\text{Spiral\_slope} = \frac{\text{VCM\_gain} \cdot \text{Electrical\_gain} \cdot \text{Other\_fixed\_mechanical\_gains}}{\text{Measured\_mechanical\_gain}}.$$

The magnitude of a gain (e.g., the measured mechanical gain) is inversely proportional to a magnitude of the slope of the spiral. Referring to plot 500, the difference between the gains 510 and 520 can show the difference between the slopes of the spirals. For example, at a frequency of 502 Hz, the difference between the gain 510 of a slower written spiral and the gain 520 of a faster written spiral can show the difference between the slopes of the spirals. The track pitch of servo tracks written using the slower written spiral and the faster written spiral will include a difference that is proportional to the difference between the slopes. Spirals with a substantially similar mechanical gain (e.g., as shown in the gains 530 and 540), will produce written servo tracks with substantially similar track pitches.

In some implementations, the gain can be determined by injecting a signal into a controller (e.g., controller 180). For example, a disturbance signal can be injected into position sensing firmware while controlling a head to stay on a predetermined path. A resulting control command and position error can be measured. The mechanical gain can be calculated as the ratio of the measured position error (e.g., timing error) to the control command, in the frequency domain. In some implementations, the measurement and injection can be performed at a single frequency (e.g., at 502 Hz in plot 500).

Figure 6:
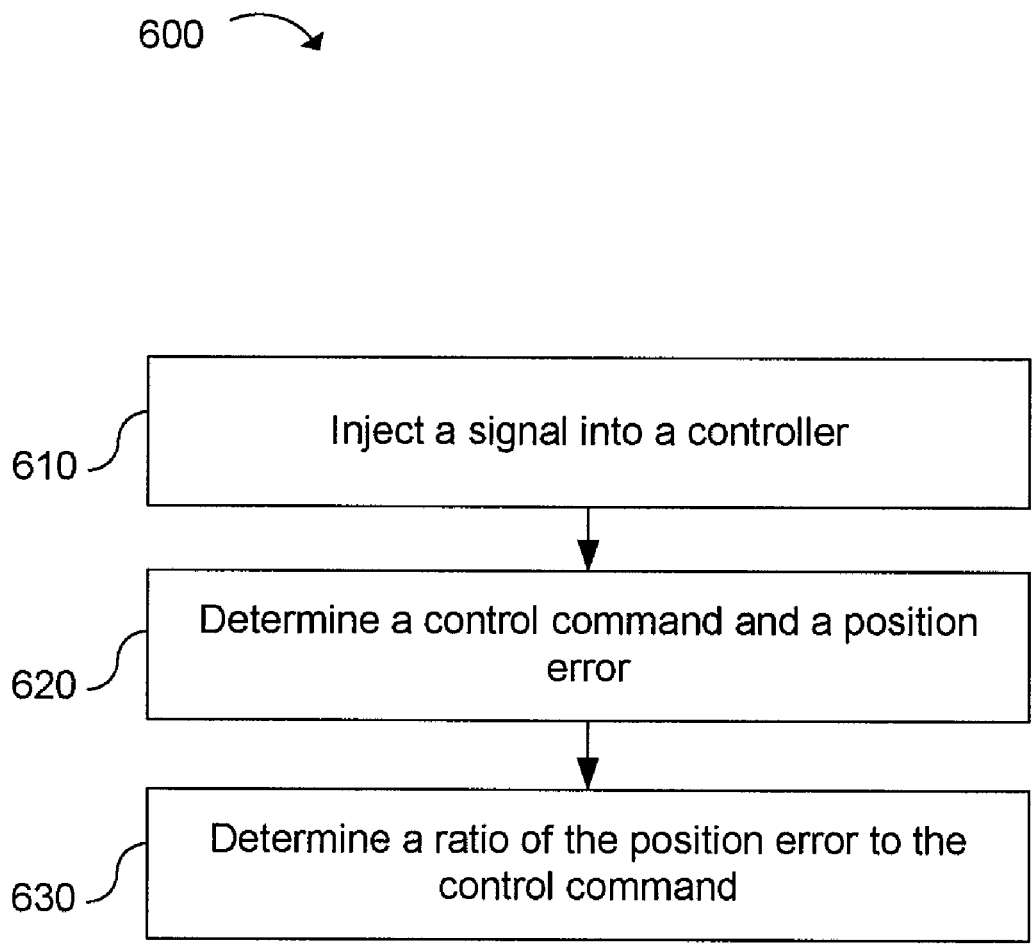
FIG. 6 is a flow chart showing an example process for determining a slope of a spiral.

FIG. 6 is a flow chart showing an example process 600 for determining a slope of a spiral. The process can include injecting 610 a signal into a controller. For example, the calibration module 172 can inject a signal into the control 180. A control command and a position error can be determined 620. For example, the processing module 174 can determine a control command and a position error. A ratio of the position error to the control command can be determined 630. For example, the calibration module 172 can determine a ratio of the position error to the control command.

Figure 7:
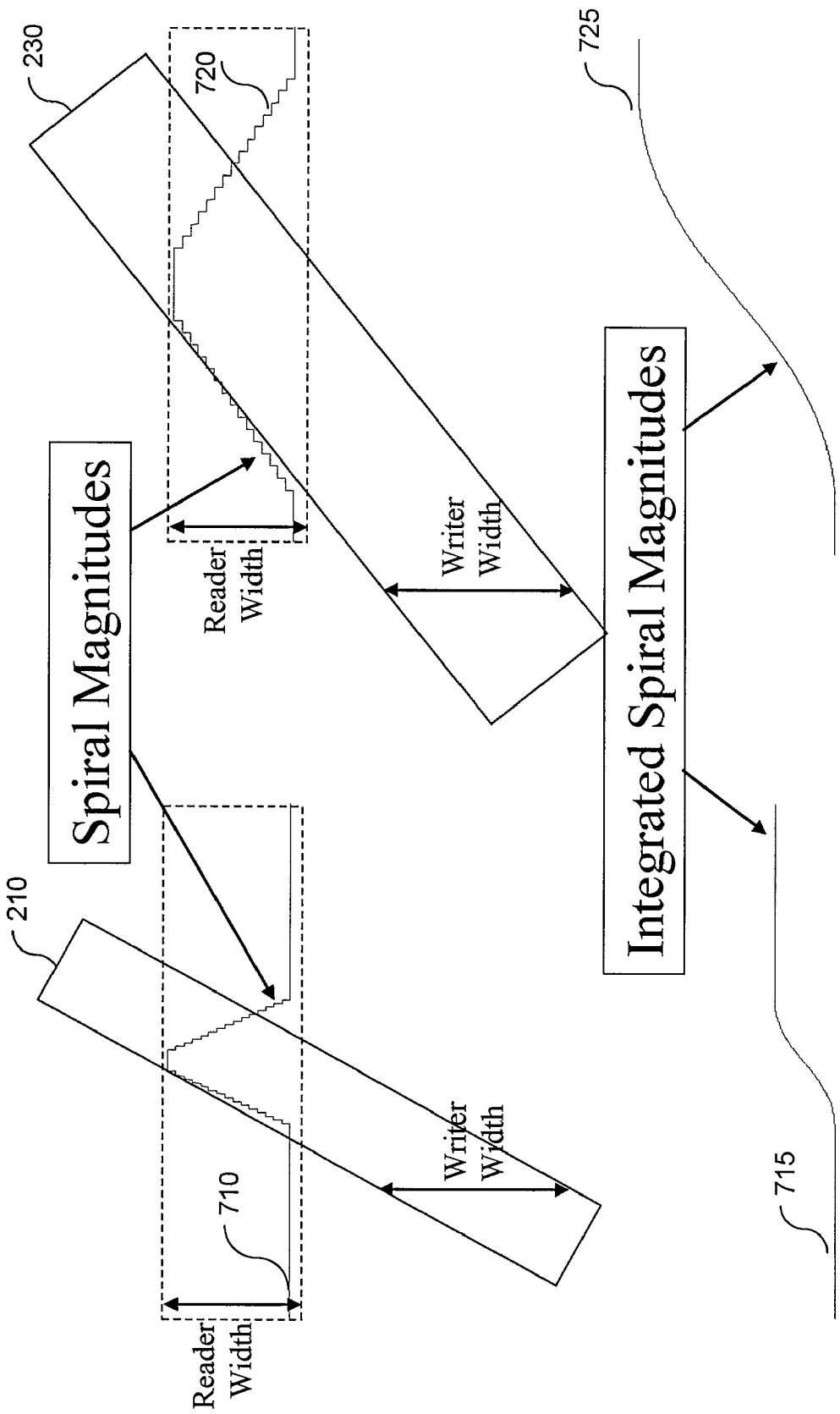
FIG. 7 includes plots showing example spiral magnitudes and example integrated spiral magnitudes.

FIG. 7 includes plots showing example spiral magnitudes 710 and 720, and example integrated spiral magnitudes 715 and 725. A reader (e.g., a read head) can read a portion of the spiral 210 to determine a spiral magnitude 710. The reader can also read a portion of the spiral 230 to determine a spiral magnitude 720. As shown in FIG. 7, the spiral magnitude 710 and the spiral magnitude 720 can be integrated to determine integrated spiral magnitudes 715 and 725, respectively. The integrated magnitudes are inversely proportional to the slope of a spiral. The integrated magnitudes can depend on, for example, head characteristics (e.g., reader and writer widths) and can be used to determine a relative measurement of the slope of a spiral.

Figures 8A, 8B:
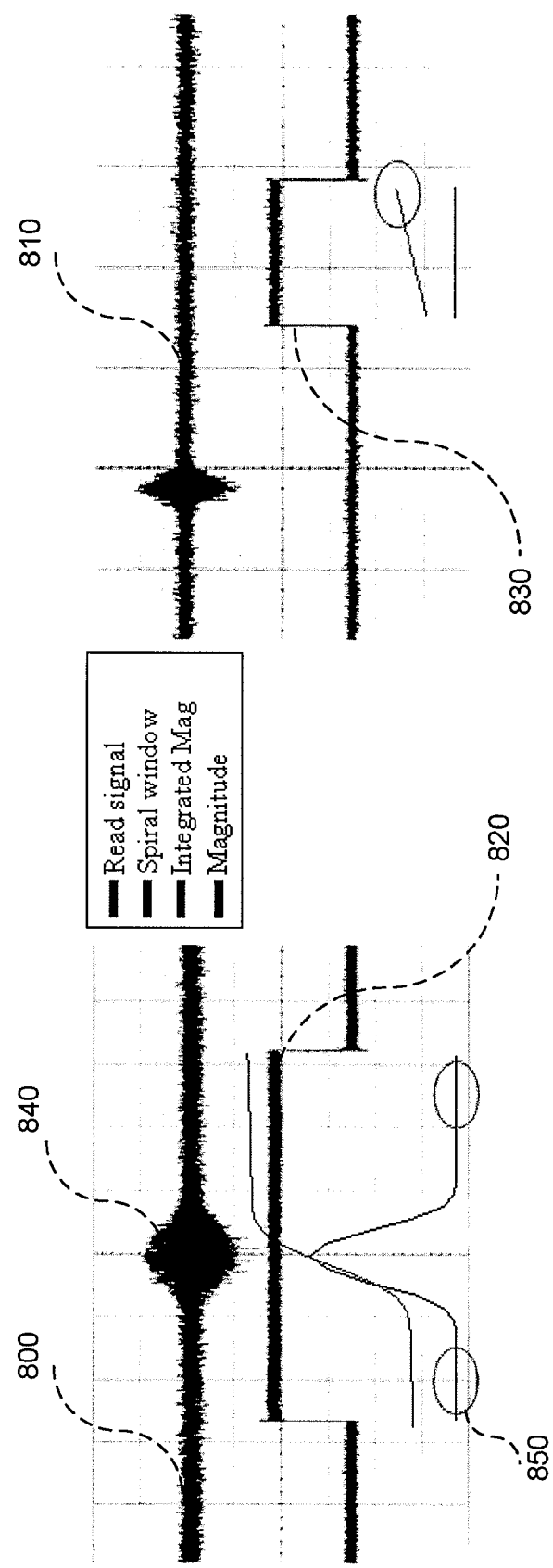
FIGS. 8A and 8B are plots showing example read signals and example spiral windows.

FIGS. 8A and 8B are plots showing example read signals 800 and 810, and example spiral windows 820 and 830. In some implementations, noise that is included in the integrated magnitudes can be removed. For example, the processing module 174 can include a correction submodule that determines and removes the noise from the integrated magnitudes. Spiral windows can be used to determine noise in the integrated magnitude.

In some implementations, the noise can be determined using an integration window 820 (e.g., a spiral window) centered on a spiral signal 840 (e.g., a spiral in the read signal). The magnitude measurements at the edges 850 of the integration window 820 may not contain a spiral signal. A value of the magnitude, or an average of values of magnitudes, at the edges of the integration window 820 can be determined. The value or the average can be multiplied by a number of samples in the integration window 820 to determine the noise in the integration window 820. In some implementations, a minimum magnitude measurement in an integration window 820 can be used to determine the noise. The minimum magnitude measurement may not include a spiral signal. The noise can be calculated by multiplying the minimum magnitude measurement by the number of samples in a window. In some implementations, the integration window 830 can be moved to a location on the read signal that does not include a spiral (e.g., the spiral signal 840) or a servo track signal (e.g., a signal indicating a servo track). The integrated magnitude of the integration window 830 at that non-spiral location can be used to determine the noise. Other implementations are possible. The noise can be subtracted from the integrated magnitude.

Figure 9:
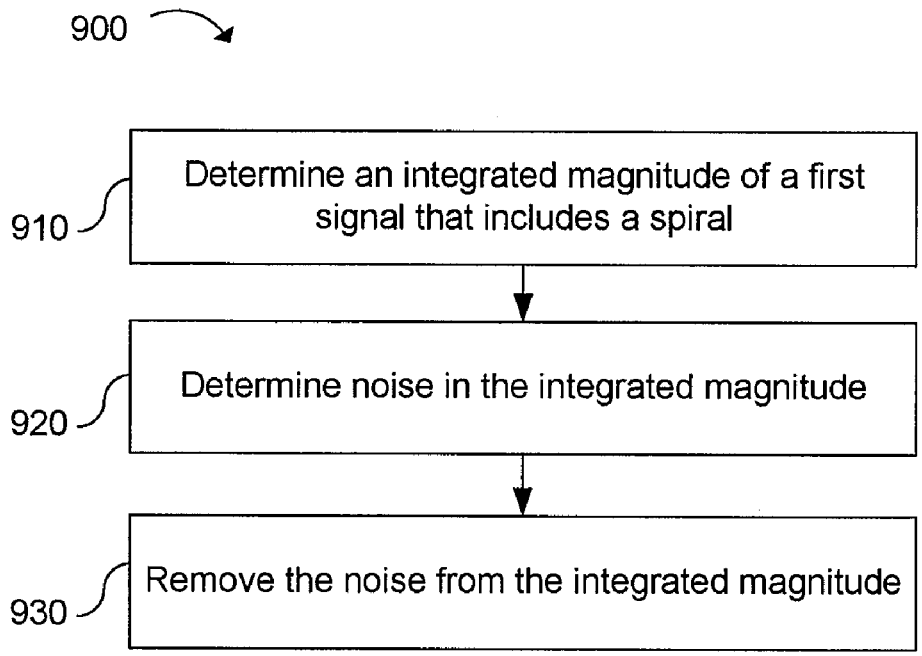
FIG. 9 is a flow chart showing another example process for determining a slope of a spiral.

FIG. 9 is a flow chart showing another example process 900 for determining a slope of a spiral. The process 900 includes determining 910 an integrated magnitude of a first signal that includes a spiral. For example, the processing module 174 can determine an integrated magnitude of a first signal that includes a spiral. Noise in the integrated magnitude is determined 920. For example, the processing module 174 can determine noise in the integrated magnitude. Noise from the integrated magnitude is removed 930. For example, the calibration module 172 can remove noise from the integrated magnitude.

In some implementations, the slope can be determined by determining a "red-shift" of the pattern within the spiral.

Figure 10:
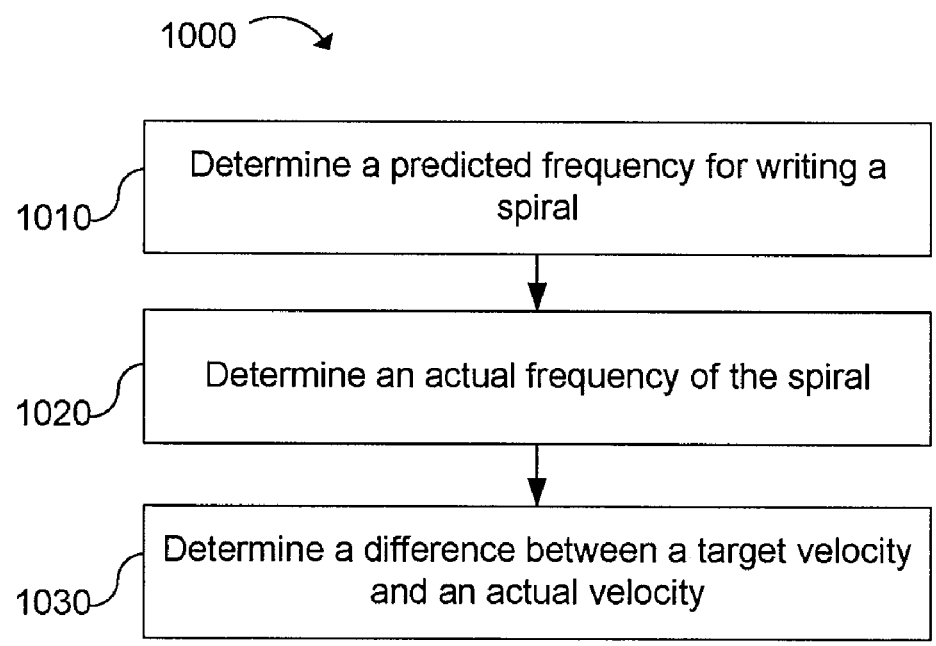
FIG. 10 is a flow chart showing another example process for determining a slope of a spiral.

FIG. 10 is a flow chart showing another example process 1000 for determining a slope of a spiral. The process 1000 can determine a slope of a spiral by determining a "red-shift" of the pattern within the spiral. The process 1000 includes determining 1010 a predicted frequency for writing a spiral. For example, the calibration module 172 can determine a predicted frequency for writing a spiral. An actual frequency of the spiral is determined 1020. For example, the processing module 174 can determine an actual frequency of the spiral, including determining a time between sync patterns of the spiral. A difference between a target velocity and an actual velocity is determined 1030. For example, a detection submodule of the processing module 174 can determine a difference between a target velocity and an actual velocity. The difference between the predicted frequency and the actual frequency can be proportional to the difference between the target velocity and the actual velocity.

The slope and a target slope of a spiral can be used to calibrate radial spacing between servo tracks. In some implementations, the ratio of the target slope to the slope (e.g., a measured slope) can be used to scale target timing information (e.g., the predetermined amount of time). For example, the calibration module 172 can include a scaling submodule that scales the target timing information. The target timing information can be scaled to produce calibrated timing information according to the equation:

$$\text{calibrated\_timing\_information} = \text{target\_timing\_information} \cdot \frac{\text{target\_slope}}{\text{slope}}.$$

The calibrated timing information can be used to determine the radial spacing between servo tracks, as described previously. If the slope is greater than the target slope, then the time can be reduced (e.g., t1 in FIG. 4A). For example, if the spiral 230 of FIG. 4B has the target slope, and the slope of the spiral 210 of FIG. 4A is greater than the target slope of FIG. 4B, then the target timing information t2 can be scaled to produce the calibrated timing information t1. If the slope is less than the target slope, then the time can be increased. As another example, if t1 represents the target timing information and the spiral 210 has the target slope, then t1 can be scaled to produce the calibrated timing information t2 for the spiral 230.

In some implementations, a target track pitch can be scaled to determine the radial spacing. For example, the calibration module 172 can include a scaling submodule that scales the target track pitch. The target track pitch can be scaled to produce a calibrated track pitch according to the equation:

$$\text{calibrated\_track\_pitch} = \text{target\_track\_pitch} \cdot \frac{\text{slope}}{\text{target\_slope}}.$$

The calibrated track pitch can be used to determine the radial spacing between servo tracks. If the slope is less than the target slope, then the target track pitch (e.g., radial track density) is decreased to produce the calibrated track pitch. If the slope is greater than the target slope, then the target track pitch is increased to produce the calibrated track pitch.

Figure 11:
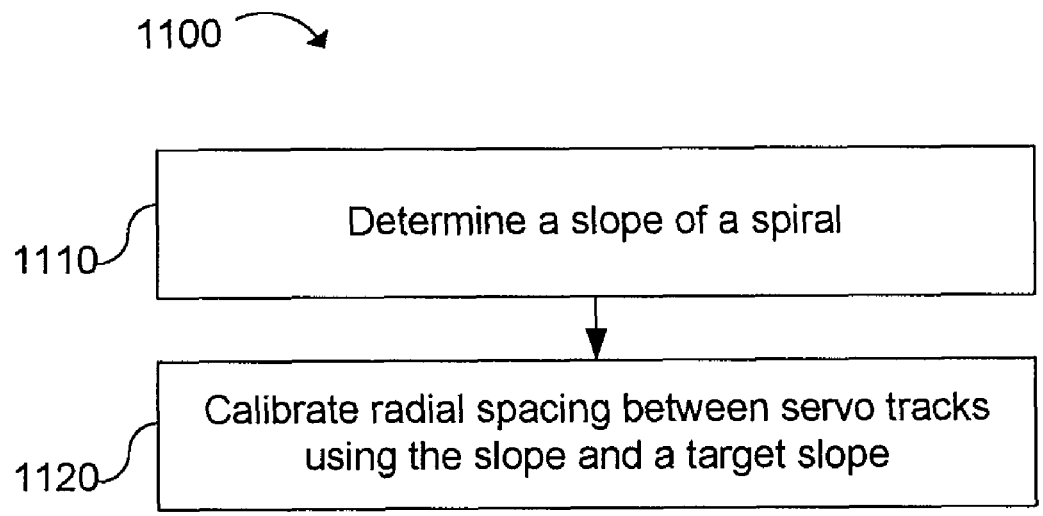
FIG. 11 is a flow chart showing an example process for calibrating radial spacing between servo tracks.

FIG. 11 is a flow chart showing an example process 1100 for calibrating radial spacing between servo tracks. The process 1100 includes determining 1110 a slope of a spiral. For example, the slope of the spiral can be determined using one or more of the implementations described previously. Radial spacing between servo tracks is calibrated 1120 using the slope and a target slope. For example, the calibration module 172 can be used to calibrate the radial spacing between servo tracks using the slope and a target slope.

Figure 12G:
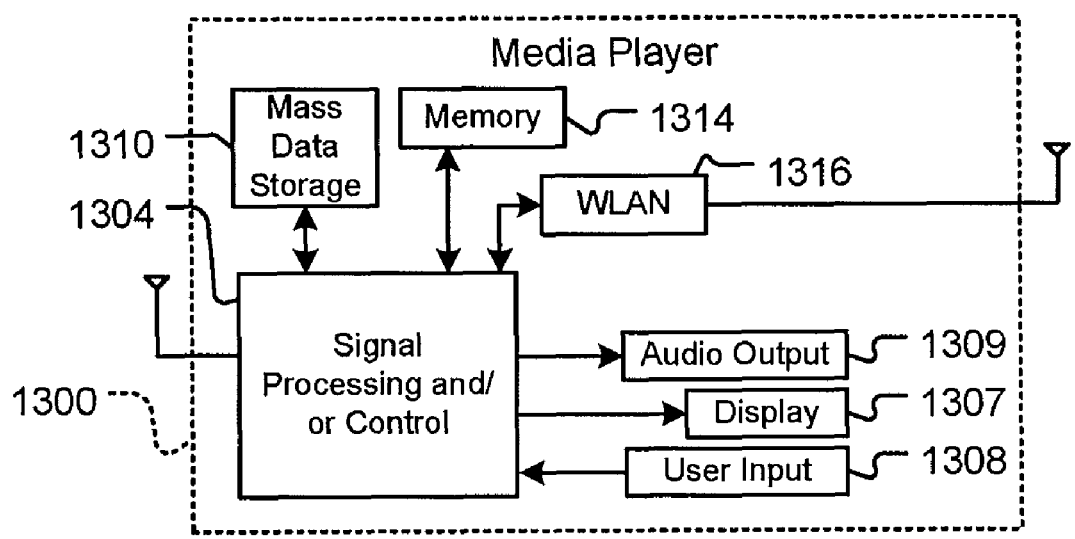
FIGS. 12A-12G show various example implementations of the described systems and techniques.
Figures 12A, 12B:
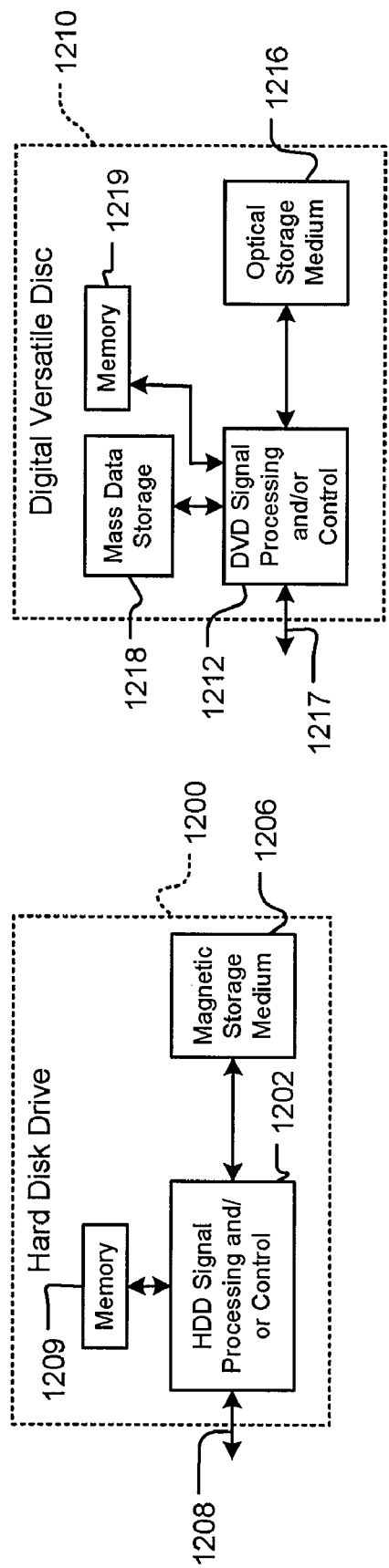

FIGS. 12A-12G show various example implementations of the described systems and techniques. Referring now to FIG. 12A, the described systems and techniques can be implemented in a hard disk drive (HDD) 1200. The described systems and techniques may be implemented in either or both signal processing and/or control circuits, which are generally identified in FIG. 12A at 1202. In some implementations, the signal processing and/or control circuit 1202 and/or other circuits (not shown) in the HDD 1200 may process data, perform coding and/or encryption, perform calculations, and/or format data that is output to and/or received from a magnetic storage medium 1206.

The HDD 1200 may communicate with a host device (not shown) such as a computer, mobile computing devices such as personal digital assistants, cellular phones, media or MP3 players and the like, and/or other devices via one or more wired or wireless communication links 1208. The HDD 1200 may be connected to memory 1209 such as random access memory (RAM), low latency nonvolatile memory such as flash memory, read only memory (ROM) and/or other suitable electronic data storage.

Referring now to FIG. 12B, the described systems and techniques can be implemented in a digital versatile disc (DVD) drive 1210. The described systems and techniques may be implemented in either or both signal processing and/or control circuits, which are generally identified in FIG. 12B at 1212, and/or mass data storage of the DVD drive 1210. The signal processing and/or control circuit 1212 and/or other circuits (not shown) in the DVD drive 1210 may process data, perform coding and/or encryption, perform calculations, and/or format data that is read from and/or data written to an optical storage medium 1216. In some implementations, the signal processing and/or control circuit 1212 and/or other circuits (not shown) in the DVD drive 1210 can also perform other functions such as encoding and/or decoding and/or any other signal processing functions associated with a DVD drive.

The DVD drive 1210 may communicate with an output device (not shown) such as a computer, television or other device via one or more wired or wireless communication links 1217. The DVD drive 1210 may communicate with mass data storage 1218 that stores data in a nonvolatile manner. The mass data storage 1218 may include a hard disk drive (HDD). The HDD may have the configuration shown in FIG. 12A. The HDD may be a mini HDD that includes one or more platters having a diameter that is smaller than approximately 1.8". The DVD drive 1210 may be connected to memory 1219 such as RAM, ROM, low latency nonvolatile memory such as flash memory and/or other suitable electronic data storage.

Figure 12D:
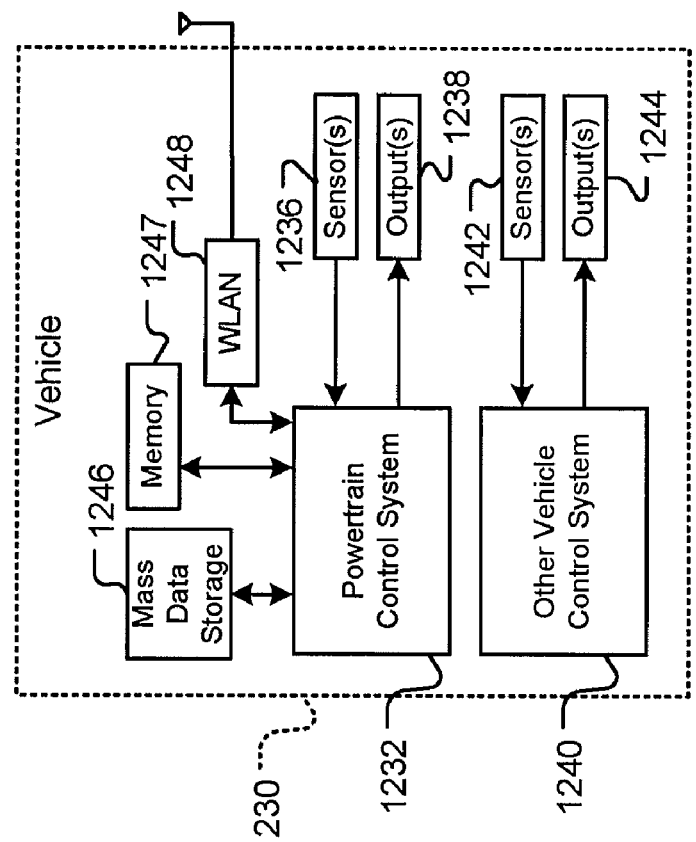
Figure 12C:
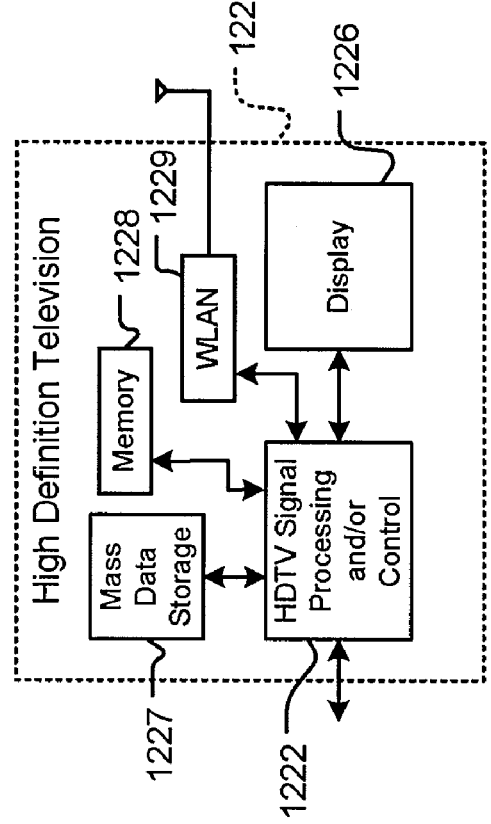

Referring now to FIG. 12C, the described systems and techniques can be implemented in a high definition television (HDTV) 1220. The described systems and techniques may be implemented in either or both signal processing and/or control circuits, which are generally identified in FIG. 12C at 1222, a WLAN interface and/or mass data storage of the HDTV 1220. The HDTV 1220 receives HDTV input signals in either a wired or wireless format and generates HDTV output signals for a display 1226. In some implementations, signal processing circuit and/or control circuit 1222 and/or other circuits (not shown) of the HDTV 1220 may process data, perform coding and/or encryption, perform calculations, format data and/or perform any other type of HDTV processing that may be required.

The HDTV 1220 may communicate with mass data storage 1227 that stores data in a nonvolatile manner such as optical and/or magnetic storage devices. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The HDTV 1220 may be connected to memory 1228 such as RAM, ROM, low latency nonvolatile memory such as flash memory and/or other suitable electronic data storage. The HDTV 1220 also may support connections with a WLAN via a WLAN interface 1229.

Referring now to FIG. 12D, the described systems and techniques may be implemented in a control system of a vehicle 1230, a WLAN interface and/or mass data storage of the vehicle control system. In some implementations, the described systems and techniques may be implemented in a powertrain control system 1232 that receives inputs from one or more sensors 1236 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 1238.

The described systems and techniques may also be implemented in other control systems 1240 of the vehicle 1230. The control system 1240 may likewise receive signals from input sensors 1242 and/or output control signals to one or more output devices 1244. In some implementations, the control system 1240 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1232 may communicate with mass data storage 1246 that stores data in a nonvolatile manner. The mass data storage 1246 may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The powertrain control system 1232 may be connected to memory 1247 such as RAM, ROM, low latency nonvolatile memory such as flash memory and/or other suitable electronic data storage. The powertrain control system 1232 also may support connections with a WLAN via a WLAN interface 1248. The control system 1240 may also include mass data storage, memory and/or a WLAN interface (all not shown).

Figure 12E:
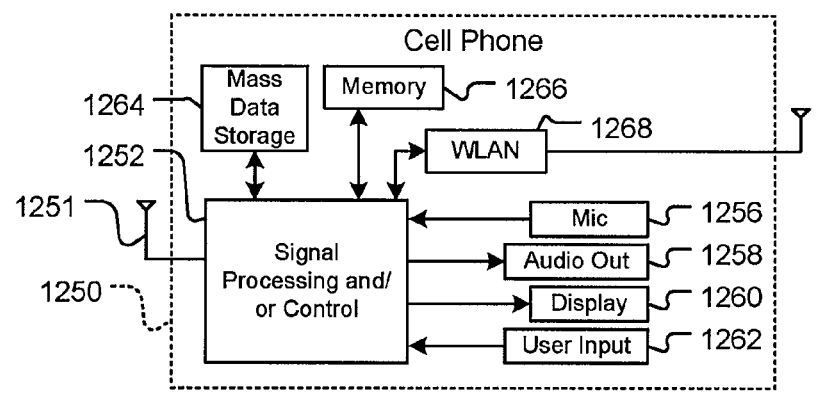

Referring now to FIG. 12E, the described systems and techniques can be implemented in a cellular phone 1250 that may include a cellular antenna 1251. The described systems and techniques may be implemented in either or both signal processing and/or control circuits, which are generally identified in FIG. 12E at 1252, a WLAN interface and/or mass data storage of the cellular phone 1250. In some implementations, the cellular phone 1250 includes a microphone 1256, an audio output 1258 such as a speaker and/or audio output jack, a display 1260 and/or an input device 1262 such as a keypad, pointing device, voice actuation and/or other input device. The signal processing and/or control circuits 1252 and/or other circuits (not shown) in the cellular phone 1250 may process data, perform coding and/or encryption, perform calculations, format data and/or perform other cellular phone functions.

The cellular phone 1250 may communicate with mass data storage 1264 that stores data in a nonvolatile manner such as optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The cellular phone 1250 may be connected to memory 1266 such as RAM, ROM, low latency nonvolatile memory such as flash memory and/or other suitable electronic data storage. The cellular phone 1250 also may support connections with a WLAN via a WLAN interface 1268.

Figure 12F:
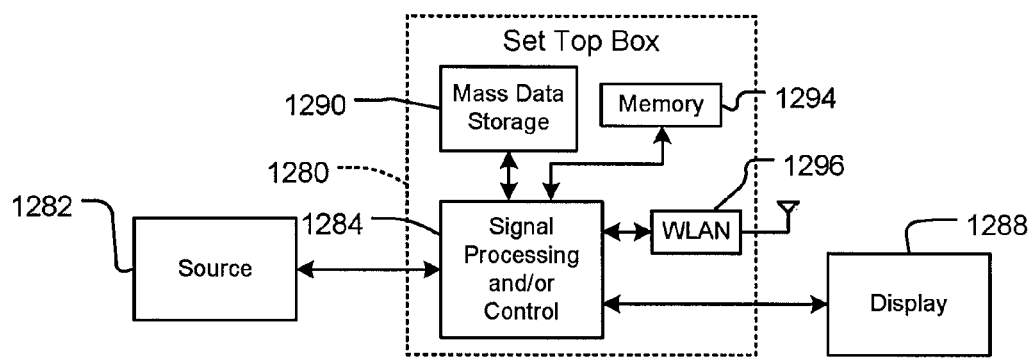

Referring now to FIG. 12F, the described systems and techniques can be implemented in a set top box 1280. The described systems and techniques may be implemented in either or both signal processing and/or control circuits, which are generally identified in FIG. 12F at 1284, a WLAN interface and/or mass data storage of the set top box 1280. The set top box 1280 receives signals from a source 1282 such as a broadband source and outputs standard and/or high definition audio/video signals suitable for a display 1288 such as a television and/or monitor and/or other video and/or audio output devices. The signal processing and/or control circuits 1284 and/or other circuits (not shown) of the set top box 1280 may process data, perform coding and/or encryption, perform calculations, format data and/or perform any other set top box function.

The set top box 1280 may communicate with mass data storage 1290 that stores data in a nonvolatile manner. The mass data storage 1290 may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The set top box 1280 may be connected to memory 1294 such as RAM, ROM, low latency nonvolatile memory such as flash memory and/or other suitable electronic data storage. The set top box 1280 also may support connections with a WLAN via a WLAN interface 1296.

Referring now to FIG. 12G, the described systems and techniques can be implemented in a media player 1300. The described systems and techniques may be implemented in either or both signal processing and/or control circuits, which are generally identified in FIG. 12G at 1304, a WLAN interface and/or mass data storage of the media player 1300. In some implementations, the media player 1300 includes a display 1307 and/or a user input 1308 such as a keypad, touchpad and the like. In some implementations, the media player 1300 may employ a graphical user interface (GUI) that typically employs menus, drop down menus, icons and/or a point-and-click interface via the display 1307 and/or user input 1308. The media player 1300 further includes an audio output 1309 such as a speaker and/or audio output jack. The signal processing and/or control circuits 1304 and/or other circuits (not shown) of the media player 1300 may process data, perform coding and/or encryption, perform calculations, format data and/or perform any other media player function.

The media player 1300 may communicate with mass data storage 1310 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The media player 1300 may be connected to memory 1314 such as RAM, ROM, low latency nonvolatile memory such as flash memory and/or other suitable electronic data storage. The media player 1300 also may support connections with a WLAN via a WLAN interface 1316. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
    a processing module that determines a measured slope of a spiral; and
    a calibration module that calibrates radial spacing between servo tracks based on a ratio of a target slope to the measured slope of the spiral.

2. The apparatus of claim 1, wherein the calibration module includes a scaling submodule that scales target timing information according to the ratio of the target slope to the measured slope to determine the radial spacing.

3. The apparatus of claim 1, wherein the calibration module includes a scaling submodule that scales a target track pitch according to the ratio of the target slope to the measured slope to determine the radial spacing.

4. The apparatus of claim 1, wherein the processing module includes a scaling submodule that calibrates the measured slope of the spiral.

5. The apparatus of claim 1, wherein the processing module includes a detection submodule that determines a gain of a system that includes a voice coil motor and a servo signal.

6. The apparatus of claim 1, wherein the processing module includes a detection submodule that determines an integrated magnitude of the spiral.

7. The apparatus of claim 6, wherein the processing module includes a correction submodule that determines noise in the integrated magnitude and removes the noise from the integrated magnitude.

8. The apparatus of claim 1, wherein the processing module includes a detection submodule that determines a difference between a predicted frequency and an actual frequency of the spiral.

9. A method comprising:
    determining a measured slope of a spiral; and
    calibrating radial spacing between servo tracks based on a ratio of a target slope to the measured slope of the spiral.

10. The method of claim 9, wherein calibrating radial spacing comprises:
    receiving target timing information;
    scaling the target timing information according to the ratio of the target slope to the measured slope, producing calibrated timing information; and
    determining the radial spacing using the calibrated timing information.

11. The method of claim 9, wherein calibrating radial spacing comprises:
    receiving a target track pitch;
    scaling the target track pitch according to the ratio of the target slope to the measured slope, producing a calibrated track pitch; and
    determining the radial spacing using the calibrated track pitch.

12. The method of claim 9, wherein the spiral has previously been written.

13. The method of claim 9, wherein determining a measured slope of a spiral includes:
    determining a first measurement of the measured slope of the spiral; and
    calibrating the first measurement of the measured slope of the spiral, producing a second measurement of the measured slope of the spiral.

14. The method of claim 9, wherein determining a measured slope of a spiral comprises:
    determining a gain of a system that includes a voice coil motor and a servo signal.

15. The method of claim 14, wherein the gain is a mechanical gain.

16. The method of claim 14, wherein a magnitude of the gain is inversely proportional to a magnitude of the measured slope.

17. The method of claim 14, wherein determining the gain comprises:
    injecting a signal into a controller;
    determining a control command and a position error; and
    determining a ratio of the position error to the control command.

18. The method of claim 17, further comprising controlling the voice coil motor with the controller.

19. The method of claim 17, wherein the position error and the control command are determined in the frequency domain.

20. The method of claim 9, wherein determining a measured slope of a spiral comprises:
    determining an integrated magnitude of a first signal that includes the spiral.

21. The method of claim 20, wherein the integrated magnitude is inversely proportional to the measured slope of the spiral.

22. The method of claim 20, further comprising:
    determining noise in the integrated magnitude; and
    removing the noise from the integrated magnitude.

23. The method of claim 22, wherein determining noise comprises:
    determining a magnitude of the first signal at an edge of an integration window; and
    multiplying the magnitude by a number of samples in the integration window.

24. The method of claim 22, wherein determining noise comprises:
    determining a minimum magnitude of the first signal in an integration window; and
    multiplying the minimum magnitude by a number of samples in the integration window.

25. The method of claim 22, wherein determining noise comprises:
    determining an integrated magnitude of a second signal that does not include the spiral.

26. The method of claim 9, wherein determining a measured slope of a spiral comprises:
    determining a predicted frequency for writing the spiral;
    determining an actual frequency of the spiral; and
    determining a difference between a target velocity and an actual velocity, wherein the difference is proportional to a difference between the predicted frequency and the actual frequency.

27. The method of claim 26, wherein determining an actual frequency of the spiral comprises:
    determining a time between sync patterns of the spiral.

* * * * *